US012445784B2

(12) United States Patent
Cai et al.

(10) Patent No.: US 12,445,784 B2
(45) Date of Patent: Oct. 14, 2025

(54) BRAIN-INSPIRED HEARING AID METHOD AND APPARATUS, HEARING AID DEVICE, COMPUTER DEVICE, AND STORAGE MEDIUM

(71) Applicants: THE CHINESE UNIVERSITY OF HONG KONG (SHENZHEN), Guangdong (CN); SHENZHEN RESEARCH INSTITUTE OF BIG DATA, Guangdong (CN)

(72) Inventors: Siqi Cai, Shenzhen (CN); Haizhou Li, Shenzhen (CN)

(73) Assignees: THE CHINESE UNIVERSITY OF HONG KONG (SHENZHEN), Shenzhen (CN); SHENZHEN RESEARCH INSTITUTE OF BIG DATA, Shenzhen (CN)

( * ) Notice: Subject to any disclaimer, the term of this patent is extended or adjusted under 35 U.S.C. 154(b) by 0 days.

(21) Appl. No.: 18/552,859

(22) PCT Filed: Dec. 30, 2022

(86) PCT No.: PCT/CN2022/143942

§ 371 (c)(1),
(2) Date: Sep. 27, 2023

(87) PCT Pub. No.: WO2024/016608

PCT Pub. Date: Jan. 25, 2024

(65) Prior Publication Data

US 2025/0088809 A1 Mar. 13, 2025

(30) Foreign Application Priority Data

Jul. 21, 2022 (CN) ......................... 202210859184.1

(51) Int. Cl.

| | |
|---|---|
| ***H04R 25/00*** | (2006.01) |
| ***G10L 15/06*** | (2013.01) |
| ***G10L 15/16*** | (2006.01) |

(52) U.S. Cl.
CPC ............ *H04R 25/40* (2013.01); *G10L 15/063* (2013.01); *G10L 15/16* (2013.01); *H04R 25/507* (2013.01); *H04R 2225/43* (2013.01)

(58) Field of Classification Search
CPC ...... H04R 25/40; H04R 25/505; H04R 25/55; H04R 2225/41; H04R 2225/43;
(Continued)

(56) References Cited

U.S. PATENT DOCUMENTS 9,084,062 B2 * 7/2015 Endo .................... H04R 25/407
9,167,356 B2 * 10/2015 Higgins ................. H04R 25/40
(Continued)

FOREIGN PATENT DOCUMENTS

CN 103945315 A 7/2014
CN 111432317 A 7/2020
(Continued)

OTHER PUBLICATIONS

International Search Report for International Application No. PCT/CN2022/143942 (3 pages).
(Continued)

*Primary Examiner* — Ryan Robinson
(74) *Attorney, Agent, or Firm* — GREENBLUM & BERNSTEIN, P.L.C.

(57) ABSTRACT

A brain-inspired hearing aid method is provided. The method includes: acquiring a noisy voice signal from a complex acoustic environment where a hearing aid wearer is located, and an electroencephalogram signal and an eye movement signal of the hearing aid wearer; performing decoding of the electroencephalogram signal to obtain a feature representation of a voice signal of an auditory attention target; performing decoding of the eye movement signal to obtain an auditory attention orientation; extracting the voice signal of the auditory attention target from the
(Continued)

noisy voice signal in a complex acoustic environment based on the feature representation; extracting a voice signal of the auditory attention orientation from the noisy voice signal in a complex acoustic environment based on the auditory attention orientation; and fusing the voice signal of the auditory attention target with the voice signal of the auditory attention orientation to obtain to-be-outputted auditory attention voice signal.

15 Claims, 6 Drawing Sheets

(58) Field of Classification Search
CPC ... H04R 2460/07; A61B 5/369; A61B 5/6815; A61B 5/6821; A61B 3/113; A61B 5/372
See application file for complete search history.

(56) References Cited

U.S. PATENT DOCUMENTS

| | | | | |
|---|---|---|---|---|
| 9,848,260 | B2 * | 12/2017 | Conliffe | G02C 11/10 |
| 12,256,198 | B2 * | 3/2025 | Gallégo | H04R 25/505 |
| 12,284,499 | B1 * | 4/2025 | Lovitt | H04R 25/407 |
| 2014/0369537 | A1 * | 12/2014 | Pontoppidan | H04R 25/606<br>381/314 |
| 2020/0201435 | A1 | 6/2020 | Ciccarelli et al. | |
| 2022/0330844 | A1 * | 10/2022 | Litvak | A61B 5/389 |
| 2023/0199413 | A1 * | 6/2023 | Komeilipoor | G06F 3/015<br>381/313 |
| 2023/0388721 | A1 * | 11/2023 | Jensen | H04R 25/405 |

FOREIGN PATENT DOCUMENTS

| | | | | |
|---|---|---|---|---|
| CN | 113143293 | A | 7/2021 | |
| CN | 115243180 | A | 10/2022 | |
| DE | 102014207914 | A1 * | 11/2015 | G02C 11/06 |
| EP | 3185590 | A1 * | 6/2017 | A61B 5/12 |
| WO | 2021/237368 | A1 | 12/2021 | |

OTHER PUBLICATIONS

Written Opinion for International Application No. PCT/CN2022/143942 (5 pages).

* cited by examiner

BRAIN-INSPIRED HEARING AID METHOD AND APPARATUS, HEARING AID DEVICE, COMPUTER DEVICE, AND STORAGE MEDIUM

CROSS REFERENCE TO RELATED APPLICATIONS

This application is a national stage application of PCT international application PCT/CN2022/143942 filed on Dec. 30, 2022 and entitled "BRAIN-INSPIRED HEARING AID METHOD AND APPARATUS, HEARING AID DEVICE, COMPUTER DEVICE, AND STORAGE MEDIUM", which claims priority to Chinese Patent Application No. 202210859184.1, filed with the China Patent Office on Jul. 21, 2022 and entitled "BRAIN-INSPIRED HEARING AID METHOD AND APPARATUS, HEARING AID DEVICE, COMPUTER DEVICE, AND STORAGE MEDIUM", the entire contents of which are incorporated herein in their entireties.

TECHNICAL FIELD

The present disclosure relates to the field of computer technologies and intelligent hearing assistance technologies, and in particular, to a brain-inspired hearing aid method, a brain-inspired hearing aid apparatus, a hearing aid device, a computer device, and a storage medium.

BACKGROUND

More than 1.5 billion people (one in five) worldwide are currently hearing-impaired, of which at least 430 million people bear moderate or aggravated hearing loss. In case of irreversible hearing loss, artificial hearing aid technology can avoid adverse consequences related to the hearing loss, and the usage of hearing aid device may effectively ameliorate communication difficulties of hearing-impaired personnels.

The conventional hearing aid device, although having a certain noise reduction capability, cannot choose to listen to the voice of a certain speaker like a healthy ear in a complex acoustic scene, but may indiscriminately amplify and transmit mixed voice signals of all speakers in the environment. As a result, a voice signal outputted by the hearing aid device is of poor quality, and the hearing-impaired personnel who wears the hearing aid device cannot effectively obtain desired information.

SUMMARY

In view of the above, a brain-inspired hearing aid method, a brain-inspired hearing aid apparatus, a hearing aid device, a computer device, a computer-readable storage medium, and a computer program product are provided for the above-mentioned technical problems.

According to a first aspect, the present disclosure provides a brain-inspired hearing aid method, which is performed by a hearing aid device, including:

acquiring a noisy voice signal from a complex acoustic environment where a hearing aid wearer is located, and an electroencephalogram signal and an eye movement signal of the hearing aid wearer;

performing decoding of the electroencephalogram signal to obtain a feature representation of a voice signal of an auditory attention target; the auditory attention target being a speaker that the hearing aid wearer pays attention to in the acoustic environment;

performing decoding of the eye movement signal to obtain an auditory attention orientation; the auditory attention orientation being an orientation that the hearing aid wearer pays attention to in the acoustic environment;

extracting a voice signal of the auditory attention target from the noisy voice signal in a complex acoustic environment based on the feature representation;

extracting a voice signal of the auditory attention orientation from the noisy voice signal in a complex acoustic environment based on the auditory attention orientation; and fusing the voice signal of the auditory attention target with the voice signal of the auditory attention orientation to obtain a to-be-outputted auditory attention voice signal.

According to a second aspect, the present disclosure provides a brain-inspired hearing aid method, which is performed by a computer device, including:

acquiring, from a hearing aid device, a noisy voice signal from a complex acoustic environment where a hearing aid wearer is located, and an electroencephalogram signal and an eye movement signal of the hearing aid wearer;

performing decoding of the electroencephalogram signal to obtain a feature representation of a voice signal of an auditory attention target; the auditory attention target being a speaker that the hearing aid wearer pays attention to in the acoustic environment;

performing decoding of the eye movement signal to obtain an auditory attention orientation; the auditory attention orientation being an orientation that the hearing aid wearer pays attention to in the acoustic environment;

extracting a voice signal of the auditory attention target from the noisy voice signal in a complex acoustic environment based on the feature representation;

extracting a voice signal of the auditory attention orientation from the acoustic environment based on the auditory attention orientation; and fusing the voice signal of the auditory attention target with the voice signal of the auditory attention orientation to obtain a to-be-outputted auditory attention voice signal, and sending the to-be-outputted auditory attention voice signal to the hearing aid device.

According to a third aspect, the present disclosure further provides a brain-inspired hearing aid apparatus, the apparatus including:

a data acquisition module configured to acquire a noisy voice signal from a complex acoustic environment where a hearing aid wearer is located, and an electroencephalogram signal and an eye movement signal of the hearing aid wearer;

an auditory attention target decoding module configured to perform decoding of the electroencephalogram signal to obtain a feature representation of a voice signal of an auditory attention target; the auditory attention target being a speaker that the hearing aid wearer pays attention to in the acoustic environment;

an auditory attention orientation decoding module configured to perform decoding of the eye movement signal to obtain an auditory attention orientation; the auditory attention orientation being an orientation that the hearing aid wearer pays attention to in the acoustic environment;

a voice extraction module configured to extract a voice signal of the auditory attention target from the noisy voice signal in a complex acoustic environment based on the feature representation;

a sound source extraction module configured to extract a voice signal of the auditory attention orientation from the noisy voice signal in a complex acoustic environment based on the auditory attention orientation; and a feature fusion module configured to fuse the voice signal of the auditory attention target with the voice signal of the auditory attention orientation to obtain a to-be-outputted auditory attention voice signal.

According to a fourth aspect, the present disclosure further provides a hearing aid device. The hearing aid device includes a memory and one or more processors, the memory storing a computer-readable instruction, wherein the computer-readable instruction, when executed by the one or more processors, causes the one or more processors to perform steps in the brain-inspired hearing aid method according to the embodiments of the present disclosure.

According to a fifth aspect, the present disclosure further provides a computer device. The computer device includes a memory and one or more processors, the memory storing a computer-readable instruction, wherein the computer-readable instruction, when executed by the one or more processors, causes the one or more processors to perform steps in the brain-inspired hearing aid method according to the embodiments of the present disclosure.

According to a sixth aspect, the present disclosure further provides one or more computer-readable storage medium. The computer-readable storage medium stores a computer-readable instruction, wherein a computer-readable instruction, when executed by the one or more processors, causes the one or more processors to perform steps in the brain-inspired hearing aid method in embodiments of the present disclosure.

According to a seventh aspect, the present disclosure further provides a computer program product. The computer program product includes a computer-readable instruction, wherein the computer-readable instruction, when executed by one or more processors, causes the one or more processors to perform steps in the brain-inspired hearing aid method according to embodiments of the present disclosure.

Details of one or more embodiments of the present disclosure are set forth in the following accompanying drawings and descriptions. Other features, objectives, and advantages of the present disclosure become obvious with references to the specification, the accompanying drawings, and the claims.

BRIEF DESCRIPTION OF THE DRAWINGS

In order to more clearly illustrate the technical solutions in the embodiments of the present disclosure or the prior art, the accompanying drawings to be used in the description of the embodiments or the prior art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION OF THE EMBODIMENTS

In order to make the objectives, technical solutions, and advantages of the present disclosure clearer, the present disclosure will be further described in detail below in conjunction with the accompanying drawings and embodiments. It should be understood that specific embodiments described herein are only intended to explain the present disclosure, and are not intended to limit the present disclosure.

Figure 1:
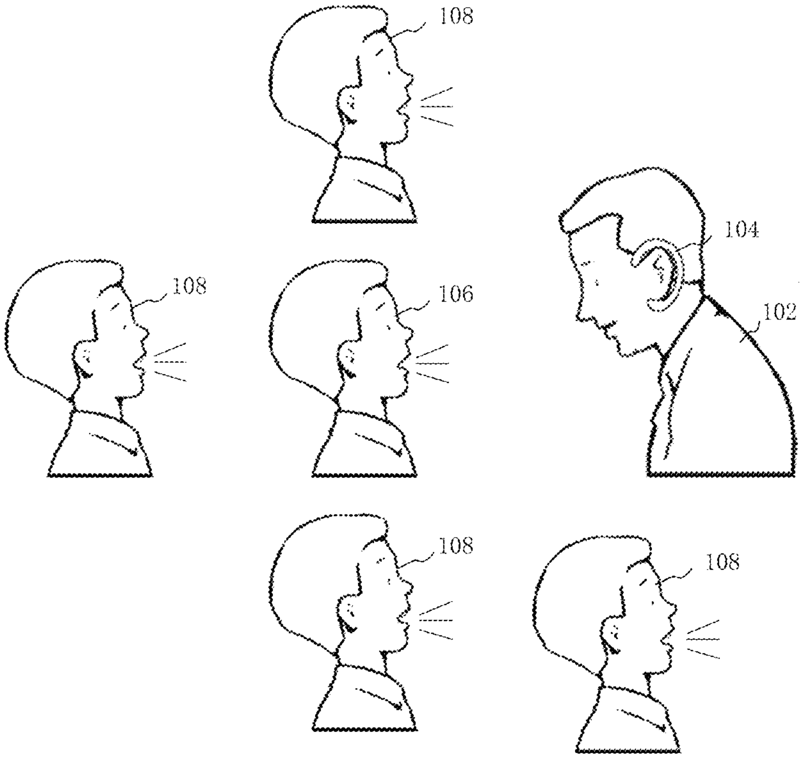
FIG. 1 is a diagram of an application environment of a brain-inspired hearing aid method according to an embodiment.

According to an embodiment, a brain-inspired hearing aid method provided in the embodiments of the present disclosure is applicable to an application environment as shown in FIG. 1. A hearing aid wearer 102 may wear a hearing aid device 104, and both an auditory attention target 106 and non-auditory attention targets 108 are speakers in a acoustic environment where the hearing aid wearer 102 is located. The auditory attention target 106 is a speaker that the hearing aid wearer 102 pays attention to, and the non-auditory attention targets 108 are speakers in the acoustic environment in addition to the auditory attention target 106. The hearing aid device 104 may collect a noisy voice signal from a complex acoustic environment, and an electroencephalogram signal and an eye movement signal of the hearing aid wearer 102, perform decoding based on the electroencephalogram signal to obtain a feature representation of a voice signal of the auditory attention target 106, perform decoding based on the eye movement signal to obtain an auditory attention orientation, extract a voice signal of the auditory attention target 106 from the noisy voice signal in a complex acoustic environment based on the feature representation, extract a voice signal of the auditory attention orientation from the noisy voice signal in a complex acoustic environment based on the auditory attention orientation, finally fuse the voice signal of the auditory attention target with the voice signal of the auditory attention orientation to obtain a to-be-outputted auditory attention voice signal, and output the auditory attention voice signal to the hearing aid wearer 102. The hearing aid wearer 102 may obtain the auditory attention voice signal from the noisy voice signal in a complex acoustic environment through the worn hearing aid device 104, so as to enable listening in a complex acoustic environment. The hearing aid wearer 102 may be a person with healthy ears or a hearing- impaired person with damaged hearing or hearing loss. The hearing aid device 104 may be in various forms for assisting the hearing-impaired persons in listening.

Figure 2:
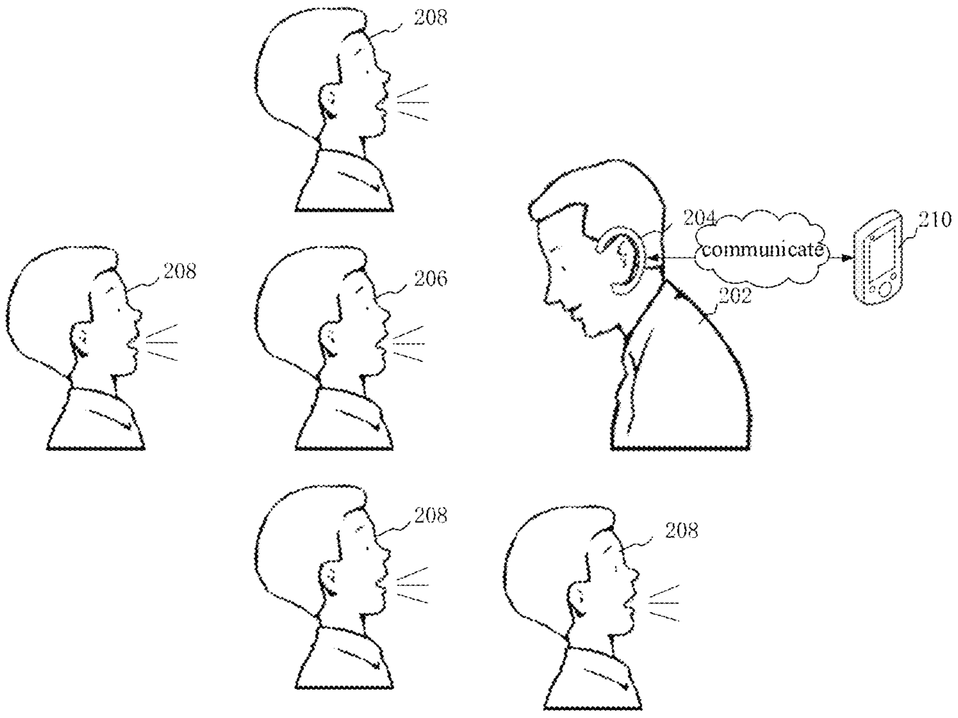
FIG. 2 is a diagram of an application environment of a brain-inspired hearing aid method according to another embodiment.

According to another embodiment, the brain-inspired hearing aid method provided by the embodiments of the present disclosure is applicable to an application environment as shown in FIG. 2. A hearing aid wearer 202 may wear a hearing aid device 204, and both an auditory attention target 206 and non-auditory attention targets 208 are speakers in an acoustic environment where the hearing aid wearer 202 is located. The auditory attention target 206 is a speaker that the hearing aid wearer 202 pays attention to, and the non-auditory attention targets 108 are speaker in the acoustic environment in addition to the auditory attention target 206. The hearing aid device 204 may communicate with a computer device 210. The hearing aid device 204 may collect a noisy voice signal in a complex acoustic environment, and an electroencephalogram signal and an eye movement signal of the hearing aid wearer 202 and send such signals to the computer device 210. The computer device 210 may acquire the noisy voice signal in a complex acoustic environment, the electroencephalogram signal, and the eye movement signal sent by the hearing aid device, perform decoding of the electroencephalogram signal to obtain a feature representation of a voice signal of the auditory attention target 206, perform decoding of the eye movement signal to obtain an auditory attention orientation, extract a voice signal of the auditory attention target 206 from the noisy voice signal in a complex acoustic environment based on the feature representation, extract a voice signal of the auditory attention orientation from the noisy voice signal in a complex acoustic environment based on the auditory attention orientation, finally fuse the voice signal of the auditory attention target with the voice signal of the auditory attention orientation to obtain a to-be-outputted auditory attention voice signal, and send the auditory attention voice signal to the hearing aid device 204. The hearing aid device 204 may output the auditory attention voice signal to the hearing aid wearer 202. The hearing aid wearer 202 may obtain the auditory attention voice signal from the noisy voice signal in a complex acoustic environment through the worn hearing aid device 204, so as to enable listening in a complex acoustic environment. The hearing aid wearer 202 may be a person with healthy ears or a hearing-impaired person with damaged hearing or hearing loss. The hearing aid device 204 may be in various forms for assisting the person with healthy ears or the hearing-impaired person for listening. The computer device 210 may be a terminal or a server. The terminal may include, but is not limited to, various personal computers, notebook computers, smartphones, tablet computers, Internet of Things devices, and portable wearable devices. The Internet of Things devices may include smart speakers, smart TVs, smart air conditioners, smart in-vehicle devices, and the likes. The server may be implemented by a standalone server or a server cluster including multiple servers. The hearing aid device 204 may communicate with the computer device 210 in a manner of, but not limited to, Bluetooth or network communication.

Figure 3:
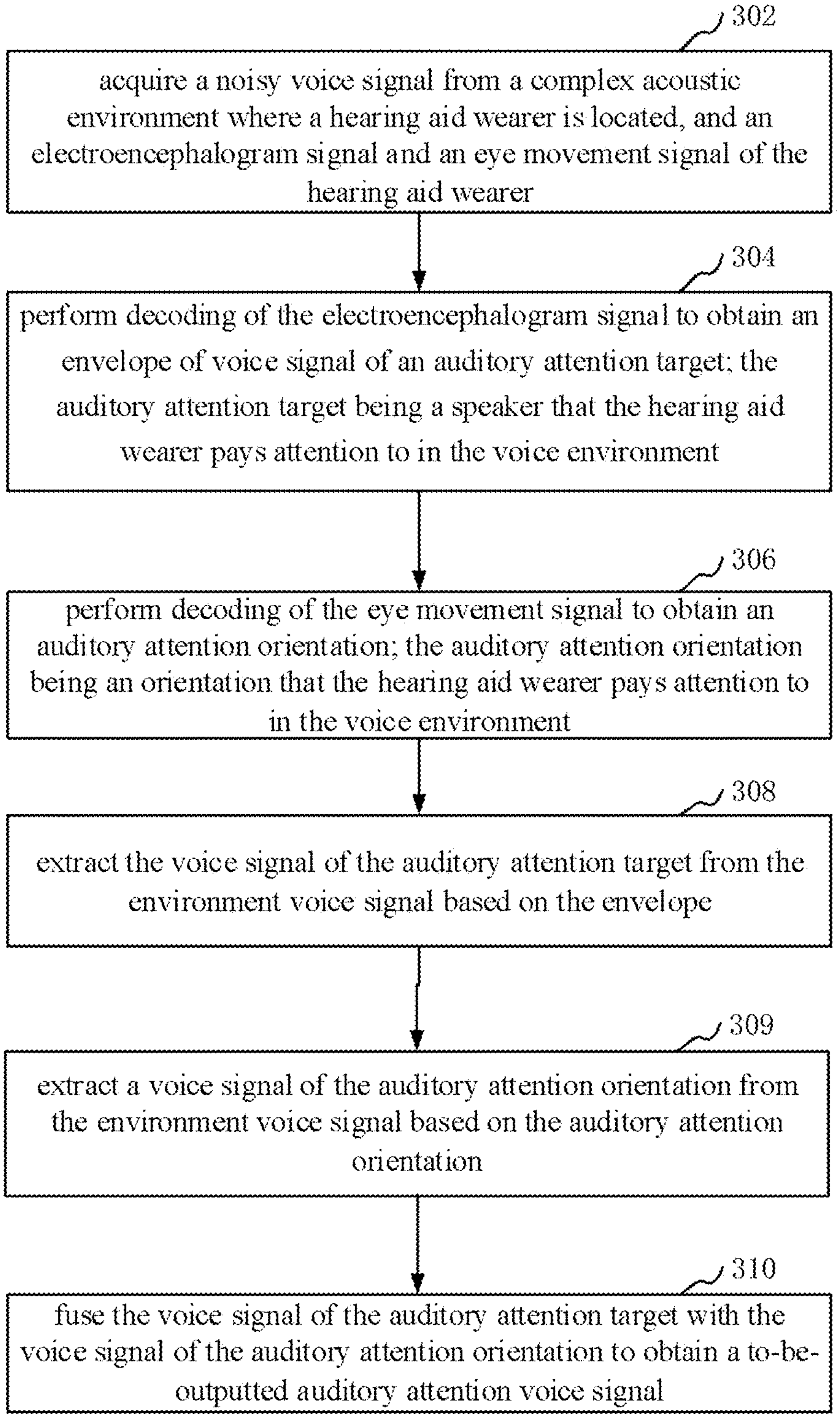
FIG. 3 is a schematic flow chart of a brain-inspired hearing aid method according to an embodiment.

According to an embodiment, as shown in FIG. 3, a brain-inspired hearing aid method is provided. Exemplary description of the method in case of applied to the hearing aid device 104 in FIG. 1 is provided, which includes the following steps.

Step 302 includes: acquiring, an environment voice signal in a voice environment where a hearing aid wearer is located, and an electroencephalogram signal and an eye movement signal of the hearing aid wearer.

The hearing aid wearer may be a person with healthy ears or a hearing-impaired person with damaged hearing or hearing loss. The acoustic environment refers to an environment, in which the hearing aid wearer is located, existing multiple voice signals. The noisy voice signal refers to a multi-channel mixed voice signal from multiple speakers in the acoustic environment. The electroencephalogram signal refers to a signal generated by an electrophysiological activity of a brain nerve tissue in cerebral cortex. The eye movement signal refers to a bioelectrical signal of a potential change around an eye caused by eyeball movement.

According to an embodiment, the electroencephalogram signal may be an electroencephalogram signal around ears of the hearing aid wearer, where "around ears" means near the ears.

It may be understood that the electroencephalogram signal and the eye movement signal are an electroencephalogram signal and an eye movement signal generated when the hearing aid wearer is located in the acoustic environment.

According to an embodiment, the hearing aid device may collect the noisy voice signal from a complex acoustic environment, and the electroencephalogram signal and the eye movement signal of the hearing aid wearer in real time, perform the brain-inspired hearing aid method in the embodiments of the present disclosure in real time to obtain a to-be-outputted auditory attention voice signal, and output the auditory attention voice signal in real time.

According to an embodiment, the hearing aid device may collect the noisy voice signal from a complex acoustic environment, and the electroencephalogram signal and the eye movement signal of the hearing aid wearer, and then perform step 304 and subsequent steps to obtain an auditory attention voice signal.

According to another embodiment, the hearing aid device may collect the noisy voice signal from a complex acoustic environment, and the electroencephalogram signal and the eye movement signal of the hearing aid wearer, and then send the collected the noisy voice signal in a complex acoustic environment, electroencephalogram signal, and eye movement signal to the computer device, and the computer device may acquire the noisy voice signal from a complex acoustic environment, the electroencephalogram signal, and the eye movement signal sent by the hearing aid device, and then perform step 304 and subsequent steps to obtain an auditory attention voice signal.

According to an embodiment, the hearing aid device may first perform at least one preprocessing, such as noise reduction, audio conversion, time-frequency analysis, feature extraction or the like on the collected noisy voice signal from a complex acoustic environment, and then perform the brain-inspired hearing aid method in the embodiments of the present disclosure based on the collected noisy voice signal from a complex acoustic environment after preprocessing.

Figure 4:
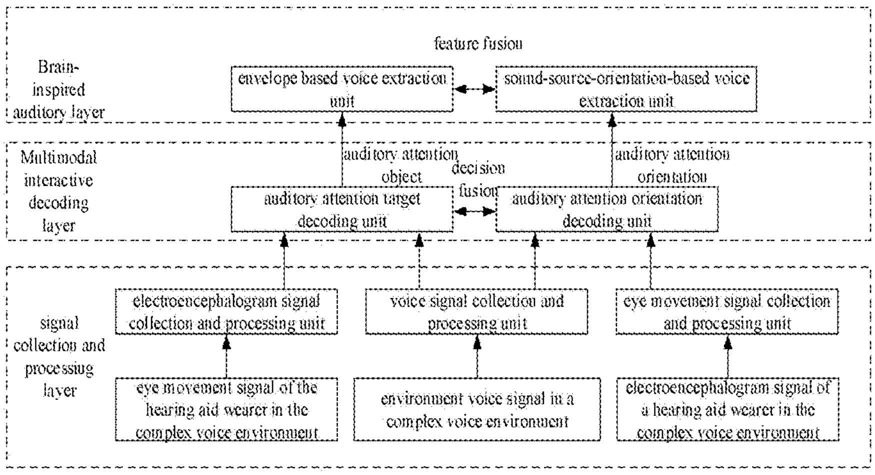
FIG. 4 is a schematic overall flow chart of a brain-inspired hearing aid method according to an embodiment.

According to an embodiment, the hearing aid device may collect the noisy voice signal from a complex acoustic environment through a voice signal collection and processing unit as shown in FIG. 4. According to an embodiment, the hearing aid device may perform voice signal preprocessing on the collected noisy voice signal from a complex acoustic environment through the voice signal collection and processing unit.

According to an embodiment, the voice signal collection and processing unit may include a voice signal collection portion, a voice signal preprocessing portion, and a voice signal analysis portion. The voice signal collection portion may collect the noisy voice signal from a complex acoustic environment. The voice signal preprocessing portion may perform at least one preprocessing, such as noise reduction, audio conversion or the like on the collected noisy voice signal from a complex acoustic environment. The voice signal analysis portion may perform time-frequency analysis on a processing result of the voice signal preprocessing portion and then extract a time-frequency feature.

According to an embodiment, the hearing aid device may first perform at least one electroencephalogram signal preprocessing of signal amplification, analog-to-digital conversion, feature extraction or the like on the collected electroencephalogram signal, and then perform the brain-inspired hearing aid method in the embodiments of the present disclosure based on the electroencephalogram signal after the electroencephalogram signal preprocessing.

According to an embodiment, the hearing aid device may collect the electroencephalogram signal of the hearing aid wearer through an electroencephalogram signal collection and processing unit as shown in FIG. 4. In an embodiment, the hearing aid device may perform electroencephalogram signal preprocessing on the collected electroencephalogram signal through the electroencephalogram signal collection and processing unit.

According to an embodiment, the electroencephalogram signal collection and processing unit may include an electroencephalogram signal collection portion, a multi-channel analog front-end amplifier circuit portion, a digital circuit portion supporting multi-channel collection, and an electroencephalogram signal processing portion. The electroencephalogram signal collection portion may collect an electroencephalogram signal of the hearing aid wearer. The multi-channel analog front-end amplifier circuit portion may perform signal amplification on the collected electroencephalogram signal, and then perform analog-to-digital conversion on the amplified electroencephalogram signal through an analog-to-digital converter to improve anti-interference performance of the signal during transmission. The digital circuit portion supporting multi-channel collection may buffer and restore the electroencephalogram signal after the analog-to-digital conversion. The electroencephalogram signal processing portion may perform feature extraction on the buffered and restored electroencephalogram signal.

According to an embodiment, the hearing aid device may first perform at least one eye movement signal preprocessing of signal amplification, noise reduction, feature extraction or the like on the collected eye movement signal, and then perform the brain-inspired hearing aid method in the embodiments of the present disclosure based on the eye movement signal after the eye movement signal preprocessing.

According to an embodiment, the hearing aid device may collect the eye movement signal of the hearing aid wearer through an eye movement signal collection and processing unit as shown in FIG. 4. According to an embodiment, the hearing aid device may perform eye movement signal preprocessing on the collected eye movement signal through the eye movement signal collection and processing unit.

According to an embodiment, the eye movement signal collection and processing unit may include an eye movement signal collection portion, an eye movement signal preprocessing portion, a filter portion, and an eye movement signal analysis portion. The eye movement signal collection portion may collect an eye movement signal of a hearing aid wearer. The eye movement signal preprocessing portion may perform at least one processing of signal amplification, artifact removal processing or the like on the collected eye movement signal. The filter portion may perform noise filtering on a result after being processed by the eye movement signal preprocessing portion. The eye movement signal analysis portion may perform feature extraction on a result after noise filtering. In an embodiment, the noise filtering may be filtering out at least one of low-frequency noise, high-frequency noise, or the like.

According to an embodiment, as shown in FIG. 4, the hearing aid device may include a signal collection and processing layer. The signal collection and processing layer may include the electroencephalogram signal collection and processing unit, the voice signal collection and processing unit, and the eye movement signal collection and processing unit.

In step 304, decoding is performed based on the electroencephalogram signal to obtain a feature representation of a voice signal of an auditory attention target; the auditory attention target being a speaker that the hearing aid wearer pays attention to in the acoustic environment.

The speaker refers to a person or thing that sends out a voice signal. The feature representation refers to an energy contour or phonetic sequence of the voice signal changing over time. Voice signals of different auditory attention targets have different feature representations.

According to an embodiment, the hearing aid device may perform learning and training in advance based on a sample of electroencephalogram signal and a sample of the noisy voice signal in a complex acoustic environment including an annotation of the auditory attention target, and obtain a capability of decoding the sample of electroencephalogram signal to obtain the feature representation of the voice signal of the auditory attention target. At a usage stage, the hearing aid device may perform decoding of the electroencephalogram signal of the hearing aid wearer to obtain the feature representation of the voice signal of the auditory attention target.

According to an embodiment, the hearing aid device may perform, through an auditory attention target decoding unit as shown in FIG. 4, decoding he electroencephalogram signal to obtain the feature representation of the voice signal of the auditory attention target.

In step 306, decoding is performed based on the eye movement signal to obtain an auditory attention orientation; the auditory attention orientation being an orientation that the hearing aid wearer pays attention to in the acoustic environment.

According to an embodiment, the hearing aid device may perform learning and training in advance based on a sample of eye movement signal and a sample of the noisy voice signal in a complex acoustic environment including an orientation label, and obtain a capability of decoding the eye movement signal to obtain an auditory attention orientation. At a usage stage, the hearing aid device may perform decoding of the eye movement signal of the hearing aid wearer to obtain the auditory attention orientation.

According to an embodiment, the hearing aid device may perform, through an auditory attention orientation decoding unit as shown in FIG. 4, decoding the eye movement signal to obtain the auditory attention orientation.

In an embodiment, step 304 and step 306 may be performed concurrently.

In step 308, a voice signal of the auditory attention target is extracted from the noisy voice signal in a complex acoustic environment based on the feature representation.

The voice signal of the auditory attention target refers to a voice signal sent by the auditory attention target.

According to an embodiment, the hearing aid device may separate the voice signal of the auditory attention target and voice signals of non-auditory attention targets from the noisy voice signal in a complex acoustic environment based on the feature representation, then enhance the voice signal of the auditory attention target, and attenuate the voice signals of the non-auditory attention targets, so as to extract a voice signal of the auditory attention target from the noisy voice signal in a complex acoustic environment.

According to an embodiment, the hearing aid device may perform learning and training in advance based on a sample of the noisy voice signal in a complex acoustic environment which includes an auditory attention target voice signal label and a sample of feature representation to obtain a capability of extracting the feature representation of the voice signal of the auditory attention target from the noisy voice signal in a complex acoustic environment. At a usage stage, the hearing aid device may extract a voice signal of the auditory attention target from the noisy voice signal in a complex acoustic environment based on the feature representation.

According to an embodiment, the hearing aid device may extract, through a feature representation based voice extraction unit as shown in FIG. 4, the voice signal of the auditory attention target from the noisy voice signal in a complex acoustic environment based on the feature representation.

In step 309, a voice signal of the auditory attention orientation is extracted from the noisy voice signal in a complex acoustic environment based on the auditory attention orientation.

The voice signal of the auditory attention orientation refers to a voice signal transmitted from the auditory attention orientation to the hearing aid device.

According to an embodiment, the hearing aid device may separate the voice signal of the auditory attention orientation and a voice signal of a non-auditory attention orientation from the noisy voice signal in a complex acoustic environment based on the auditory attention orientation, then enhance the voice signal of the auditory attention orientation, and attenuate the voice signal of the non-auditory attention orientation, so as to extract a voice signal of the auditory attention orientation from the noisy voice signal in a complex acoustic environment.

According to an embodiment, the hearing aid device may perform learning and training in advance based on a sample of eye movement signal and a sample of the noisy voice signal in a complex acoustic environment including an orientation label, and obtain a capability of extracting the voice signal of the auditory attention orientation from the noisy voice signal in a complex acoustic environment based on the auditory attention orientation. At a stage of usage, the hearing aid device may extract a voice signal of the auditory attention orientation from the noisy voice signal in a complex acoustic environment based on the auditory attention orientation.

According to an embodiment, the hearing aid device may extract, through a sound-source-orientation-based voice extraction unit as shown in FIG. 4, a voice signal of an auditory attention orientation from a noisy voice signal in a complex acoustic environment based on the auditory attention orientation.

According to an embodiment, as shown in FIG. 4, the hearing aid device may include a brain-inspired auditory layer. The brain-inspired auditory layer may include the feature representation based voice extraction unit and the sound-source-orientation-based voice extraction unit.

In step 310, the voice signal of the auditory attention target is fused with the voice signal of the auditory attention orientation to obtain a to-be-outputted auditory attention voice signal.

Specifically, as shown in FIG. 4, the hearing aid device may perform feature fusion on the voice signal of the auditory attention target and the voice signal of the auditory attention orientation to obtain a to-be-outputted auditory attention voice signal. The feature fusion means performing information integration on the voice signal of the auditory attention target and the voice signal of the auditory attention orientation to extract useful information.

According to an embodiment, the hearing aid device may input the voice signal of the auditory attention target and the voice signal of the auditory attention orientation to a feature fusion network layer, and fuse, through the feature fusion network layer, the voice signal of the auditory attention target with the voice signal of the auditory attention orientation to obtain the to-be-outputted auditory attention voice signal. The feature fusion network layer refers to a neural network layer for feature fusion. According to an embodiment, the feature fusion network layer may be a neural network of at least one layer.

According to an embodiment, the hearing aid device may perform, through the feature representation based voice extraction unit and the sound-source-orientation-based voice extraction unit, feature fusion on the voice signal of the auditory attention target and the voice signal of the auditory attention orientation. According to an embodiment, the feature fusion network layer may be disposed in the-feature representation based voice extraction unit and the sound-source-orientation-oriented voice extraction unit.

In an embodiment, step 308 and step 309 may be performed concurrently.

In the above-mentioned brain-inspired hearing aid, a noisy voice signal in a complex acoustic environment where a hearing aid wearer is located is acquired, and an electroencephalogram signal and an eye movement signal of the hearing aid wearer are acquired. Decoding is performed based on the electroencephalogram signal to obtain a feature representation of a voice signal of an auditory attention target, and decoding is performed based on the eye movement signal to obtain an auditory attention orientation. A voice signal of the auditory attention target is extracted from the noisy voice signal in a complex acoustic environment based on the feature representation, a voice signal of an auditory attention orientation is extracted from the noisy voice signal in a complex acoustic environment based on the auditory attention orientation, and finally the voice signal of the auditory attention target is fused with the voice signal of the auditory attention orientation to obtain a to-be-outputted auditory attention voice signal. By means of a multimodal interaction, and based on a combination of the noisy voice signal in a complex acoustic environment, the electroencephalogram signal, and the eye movement signal of various modalities, a human brain auditory activity and eye movement of the hearing aid wearer may be coupled, and the voice signal of the auditory attention target and the voice signal of the auditory attention orientation can be extracted respectively based on an auditory attention selection mechanism (i.e., brain-inspired hearing) and then be fused to obtain the auditory attention voice signal, such that the auditory attention voice signal can be more in line with a hearing effect of healthy ears, thereby improving quality of the auditory attention voice signal outputted by the hearing aid device, which enables the person with healthy ears or the hearing-impaired person wearing the hearing aid device to listen and communicate normally in a complex acoustic environment. This leads to the development of intelligent, advanced, and personalized hearing aids.

In an embodiment, the performing decoding of the electroencephalogram signal to obtain the feature representation of the voice signal of the auditory attention target includes: inputting the electroencephalogram signal into a voice feature decoding model, and performing decoding through the voice feature decoding model to obtain the feature representation of the voice signal of the auditory attention target;

wherein the voice feature decoding model is pre-trained based on a sample of electroencephalogram signal and a sample of the noisy voice signal in a complex acoustic environment that includes an annotation of the auditory attention target.

The voice feature decoding model is a model configured to perform decoding of the electroencephalogram signal to obtain the voice signal of the auditory attention target. The sample of electroencephalogram signal is an electroencephalogram signal used by the voice feature decoding model at a model training stage. The sample of the noisy voice signal in a complex acoustic environment is a voice signal used by the voice feature decoding model at the model training stage. The annotation of the auditory attention target is a annotation marked on the voice signal of the auditory attention target in the sample of the noisy voice signal in a complex acoustic environment by the voice feature decoding model at the model training stage.

Specifically, at a training stage, the hearing aid device may input the sample of electroencephalogram signal and the sample of the noisy voice signal in a complex acoustic environment which includes an annotation of the auditory attention target into a voice feature decoding model to be trained, perform model training iteratively, and obtain a trained voice feature decoding model. At a usage stage, the hearing aid device may input the electroencephalogram signal into a pre-trained voice feature decoding model, and perform decoding based on the electroencephalogram signal through the voice feature decoding model to obtain the feature representation of the voice signal of the auditory attention target.

According to another embodiment, model training may be performed on the voice feature decoding model first through a computer device, and then the trained voice feature decoding model is implanted into the hearing aid device.

According to an embodiment, the voice feature decoding model may be a machine learning model.

According to an embodiment, the voice feature decoding model may be a deep neural network model (i.e., a deep learning model), or other types of machine learning models.

According to an embodiment, the voice feature decoding model may be a convolutional neural network model, or other types of deep neural network models.

According to the above-mentioned embodiments, the hearing aid device inputs the electroencephalogram signal into the voice feature decoding model, performs decoding through the voice feature decoding model to obtain the feature representation of the voice signal of the auditory attention target. The hearing aid device is able to learn and analyze deep-level features in the electroencephalogram signal, thereby accurately performing decoding based on the electroencephalogram signal to obtain the feature representation of the voice signal of the auditory attention target, such that an accurate voice signal of the auditory attention target may be extracted based on the accurate feature representation. This improves an accuracy of the extracted voice signal of the auditory attention target. In addition, the auditory attention voice signal is extracted by combining multimodal information such as the electroencephalogram signal and the voice signal, which suits better with the human auditory attention selection mechanism, so that the finally extracted auditory attention voice signal is more in line with listening effect of healthy ears, thereby improving a quality of the auditory attention voice signal outputted by the hearing aid device.

According to an embodiment, the voice feature decoding model is obtained through a voice feature decoding model training step; and a step of voice feature decoding model training includes: inputting the sample of electroencephalogram signal and the sample of the noisy voice signal in a complex acoustic environment which includes an annotation of the auditory attention target into a to-be-trained voice feature decoding model; obtaining a predicted feature representation based on the sample of electroencephalogram signal through the to-be-trained voice feature decoding model; and iteratively adjusting model parameters of the to-be-trained voice feature decoding model based on a difference between the predicted feature representation and feature representation of the auditory attention target which is included in the sample of the noisy voice signal in a complex acoustic environment through the to-be-trained voice feature decoding model until an iteration stop condition is satisfied, such that a trained voice feature decoding model is obtained.

Specifically, in each iteration, the hearing aid device may input the sample of electroencephalogram signal and the sample of the noisy voice signal in a complex acoustic environment which includes an annotation of the auditory attention target into the to-be-trained voice feature decoding model, perform decoding of the sample of electroencephalogram signal through the to-be-trained voice feature decoding model to obtain the predicted feature representation, then adjust the model parameters of the to-be-trained voice feature decoding model according to the difference between the predicted feature representation and the feature representation of the auditory attention target label which is included in the sample of the noisy voice signal in a complex acoustic environment, iterate in a similar manner until the iteration stop condition is satisfied, and obtain the trained voice feature decoding model.

According to the above-mentioned embodiments, at the model training stage, the hearing aid device may input the sample of electroencephalogram signal and the sample of the noisy voice signal in a complex acoustic environment, which includes an annotation of the auditory attention target, into the voice feature decoding model to be trained to iteratively train the voice feature decoding model, so that the voice feature decoding model is able to learn and analyze deep-level features in the electroencephalogram signal, thereby accurately performing decoding of the electroencephalogram signal to obtain the feature representation of the voice signal of the auditory attention target, such that an accurate voice signal of the auditory attention target may be extracted according to the accurate feature representation, which improves an accuracy of the extracted voice signal of the auditory attention target. In addition, the auditory attention voice signal is extracted by combining multimodal information such as the electroencephalogram signal and the voice signal, which suits better with the human auditory attention selection mechanism, so that the finally extracted auditory attention voice signal is more in line with a listening effect of healthy ears, thereby improving a quality of the auditory attention voice signal outputted by the hearing aid device.

According to an embodiment, performing decoding of an eye movement signal to obtain the auditory attention orientation includes: inputting the eye movement signal into a voice orientation decoding model, and performing decoding through the voice orientation decoding model to obtain the auditory attention orientation; the voice orientation decoding model is pre-trained based on a sample of eye movement signal and a sample of the noisy voice signal in a complex acoustic environment which includes an orientation label.

The voice orientation decoding model is a model configured to perform decoding of the eye movement signal to obtain the auditory attention orientation. The sample of eye movement signal is an eye movement signal used by the voice orientation decoding model at a model training stage. The sample of the noisy voice signal in a complex acoustic environment is a voice signal used by the voice orientation decoding model at the model training stage. The orientation label is an orientation marked in the sample of the noisy voice signal in a complex acoustic environment by the voice orientation decoding model at the model training stage.

Specifically, at a training stage, the hearing aid device may input a sample of eye movement signal and a sample of the noisy voice signal in a complex acoustic environment including an orientation label into a to-be-trained voice orientation decoding model, and perform model training iteratively to obtain a trained voice orientation decoding model. At a usage stage, the hearing aid device may input an eye movement signal into the voice orientation decoding model, and perform decoding of the eye movement signal through the voice orientation decoding model to obtain an auditory attention orientation.

According to another embodiment, model training may be performed on the voice orientation decoding model first through a computer device, and then the trained voice orientation decoding model is implanted into the hearing aid device.

According to an embodiment, the voice orientation decoding model may be a machine learning model.

According to an embodiment, the voice orientation decoding model may be a deep neural network model, or other types of machine learning models.

According to an embodiment, the voice orientation decoding model may be a convolutional neural network model, or other types of deep neural network models.

In the above-mentioned embodiments, the hearing aid device inputs an eye movement signal into the voice orientation decoding model, and performs decoding through the voice orientation decoding model to obtain an auditory attention orientation. The hearing aid device is able to learn and analyze deep-level features in the eye movement signal, thereby accurately performing decoding of the eye movement signal to obtain the auditory attention orientation, and then extract an accurate voice signal of the auditory attention orientation based on the accurate auditory attention orientation, which improves accuracy of the extracted voice signal of the auditory attention orientation. In addition, an auditory attention voice signal is extracted by combining multimodal information such as an eye movement signal and a voice signal, which suits better with the human auditory attention selection mechanism, such that an eventually extracted auditory attention voice signal is more in line with listening effect of healthy ears, and thereby improving a quality of the auditory attention voice signal outputted by the hearing aid device.

According to an embodiment, the voice orientation decoding model is obtained through voice orientation decoding model training steps; and the voice orientation decoding model training steps include: inputting a sample of eye movement signal and a sample of the noisy voice signal in a complex acoustic environment including an orientation label into a to-be-trained voice orientation decoding model; obtaining a predicted orientation based on the sample of eye movement signal through the to-be-trained voice orientation decoding model; and iteratively adjusting model parameters of the to-be-trained voice orientation decoding model based on a difference between the predicted orientation and the orientation label included in the sample of the noisy voice signal in a complex acoustic environment through the to-be-trained voice orientation decoding model until an iteration stop condition is satisfied, such that a trained voice orientation decoding model is obtained.

Specifically, in each iteration, the hearing aid device may input the sample of eye movement signal and the sample of the noisy voice signal in a complex acoustic environment including the orientation label into the to-be-trained voice orientation decoding model, perform decoding of the sample of eye movement signal through the to-be-trained voice orientation decoding model to obtain a predicted orientation, then adjust the model parameters of the to-be-trained voice orientation decoding model based on the difference between the predicted orientation and the orientation label included in the sample of the noisy voice signal in a complex acoustic environment, iterate in such a manner until the iteration stop condition is satisfied, and obtain the trained voice orientation decoding model.

According to the above-mentioned embodiments, at a model training stage, the hearing aid device may input a sample of eye movement signal and a sample of the noisy voice signal in a complex acoustic environment including the orientation label into a to-be-trained voice orientation decoding model to iteratively train the voice orientation decoding model, such that the voice orientation decoding model can learn and analyze deep-level features in the eye movement signal, thereby accurately performing decoding of the eye movement signal to obtain the auditory attention orientation, and can further extract an accurate voice signal of the auditory attention orientation based on the accurate auditory attention orientation, which improves accuracy of the extracted voice signal of auditory attention orientation. In addition, the auditory attention voice signal is extracted by combining multimodal information such as the eye movement signal and the voice signal, which suits better with the human auditory attention selection mechanism, such that the eventually extracted auditory attention voice signal is more in line with the listening effect of the healthy ears, improving the quality of the auditory attention voice signal outputted by the hearing aid device.

According to an embodiment, the extracting the voice signal of the auditory attention target from the noisy voice signal in a complex acoustic environment based on the feature representation includes: inputting the feature representation and the noisy voice signal in a complex acoustic environment into a voice extraction model, and extracting the voice signal of the auditory attention target from the noisy voice signal in a complex acoustic environment based on the feature representation through the voice extraction model.

The voice extraction model is a model configured to extract a voice signal of the auditory attention target from the noisy voice signal in a complex acoustic environment based on the feature representation.

According to an embodiment, the voice extraction model may be a machine learning model.

According to an embodiment, the voice extraction model may be a deep neural network model, or other types of machine learning models.

According to an embodiment, the voice extraction model may be a convolutional neural network model, or other types of deep neural network models.

According to an embodiment, at a training stage, the hearing aid device may input a sample of the noisy voice signal in a complex acoustic environment including an annotation of the auditory attention target into a to-be-trained voice extraction model, extract a predicted voice signal from the sample of the noisy voice signal in a complex acoustic environment based on the sample of electroencephalogram signal through the to-be-trained voice extraction model, and then iteratively adjust model parameters of the voice extraction model based on a difference between the predicted voice signal and the auditory attention target voice signal label, until an iteration stop condition is satisfied, such that a trained voice extraction model is obtained. At a usage stage, the hearing aid device may input the electroencephalogram signal and the noisy voice signal in a complex acoustic environment into a pre-trained voice extraction model, and extract a voice signal of the auditory attention target from the noisy voice signal in a complex acoustic environment based on the feature representation through the voice extraction model.

According to another embodiment, model training may be performed on the voice extraction model first through a computer device, and then the trained voice extraction model is implanted into the hearing aid device.

According to the above-mentioned embodiments, deep-level learning and analysis are performed on the electroencephalogram signal and the noisy voice signal in a complex acoustic environment through the voice extraction model, the voice signal of the auditory attention target can be accurately extracted from the noisy voice signal in a complex acoustic environment, which further obtains an accurate auditory attention voice signal by fusing a voice signal of an accurate auditory attention target and a voice signal of an accurate auditory attention orientation. This improves quality of the voice signal outputted by the hearing aid device. In addition, the voice signals are extracted based on the auditory attention target and the auditory attention orientation and are fused to obtain the auditory attention voice signal, such that the analysis is more comprehensive, and the auditory attention voice signal can be obtained more accurately.

According to an embodiment, the extracting the voice signal of the auditory attention orientation from the noisy voice signal in a complex acoustic environment based on the auditory attention orientation includes: inputting the auditory attention orientation and the noisy voice signal in a complex acoustic environment into a sound source extraction model, and extracting a voice signal of the auditory attention orientation from the noisy voice signal in a complex acoustic environment based on the auditory attention orientation through the sound source extraction model.

The sound source extraction model is a model configured to extract a voice signal of the auditory attention orientation from the noisy voice signal in a complex acoustic environment based on the auditory attention orientation.

According to an embodiment, the sound source extraction model may be a machine learning model.

According to an embodiment, the sound source extraction model may be a deep neural network model, or other types of machine learning models.

According to an embodiment, the sound source extraction model may be a convolutional neural network model, or other types of deep neural network models.

According to an embodiment, at a training stage, the hearing aid device may input a sample of the noisy voice signal in a complex acoustic environment including an auditory attention orientation voice signal label and a sample electroencephalogram signal into a to-be-trained sound source extraction model, extract a predicted voice signal from the sample of the noisy voice signal in a complex acoustic environment based on the sample of electroencephalogram signal through the to-be-trained sound source extraction model, and then iteratively adjust model parameters of the sound source extraction model based on a difference between the predicted voice signal and the auditory attention orientation voice signal label, until an iteration stop condition is satisfied, such that a trained sound source extraction model is obtained. At a usage stage, the hearing aid device may input the auditory attention orientation and the noisy voice signal in a complex acoustic environment into a pre-trained sound source extraction model, and extract a voice signal of the auditory attention orientation from the noisy voice signal in a complex acoustic environment based on the auditory attention orientation through the sound source extraction model.

According to another embodiment, model training may be performed on the sound source extraction model first through a computer device, and then the trained sound source extraction model is implanted into the hearing aid device.

According to the above-mentioned embodiments, deep-level learning and analysis are performed on the auditory attention orientation and the noisy voice signal in a complex acoustic environment through the sound source extraction model, the voice signal of the auditory attention orientation can be accurately extracted from the noisy voice signal in a complex acoustic environment, which further obtains an accurate auditory attention voice signal by fusing a voice signal of an accurate auditory attention target and a voice signal of an accurate auditory attention orientation. This improves quality of the voice signal outputted by the hearing aid device. In addition, the voice signals are extracted based on the auditory attention target and the auditory attention orientation and are fused to obtain the auditory attention voice signal, such that the analysis is more comprehensive, and the auditory attention voice signal can be obtained more accurately.

According to an embodiment, the method further includes: performing decision fusion on the feature representation and the auditory attention orientation to obtain a target feature representation and a target auditory attention orientation; the extracting the voice signal of the auditory attention target from the noisy voice signal in a complex acoustic environment based on the feature representation includes: extracting the voice signal of the auditory attention target from the noisy voice signal in a complex acoustic environment based on the target feature representation; and the extracting a voice signal of the auditory attention orientation from the noisy voice signal in a complex acoustic environment based on the auditory attention orientation includes: extracting the voice signal of the auditory attention orientation from the noisy voice signal in a complex acoustic environment based on the target auditory attention orientation.

The decision fusion refers to optimizing two decoding results according to each other's decoding results.

According to an embodiment, as shown in FIG. 4, the hearing aid device may perform decision fusion through an auditory attention target decoding unit and an auditory attention orientation decoding unit.

According to an embodiment, as shown in FIG. 4, the hearing aid device may include a multimodal interactive decoding layer. The multimodal interactive decoding layer may include an auditory attention target decoding unit and an auditory attention orientation decoding unit.

According to the above-mentioned embodiments, decision fusion is performed on the feature representation and the auditory attention orientation to obtain a target feature representation and a target auditory attention orientation, and a mutual optimization based on the feature representation and the auditory attention orientation is realized, which improves accuracy of the feature representation and the auditory attention orientation. This allows voice signal of an accurate auditory attention target and a voice signal of an accurate auditory attention orientation to be extracted based on the accurate target feature representation and the accurate target auditory attention orientation obtained by decision fusion. An accurate auditory attention voice signal can be further obtained by fusing a voice signal of the accurate auditory attention target and a voice signal of the accurate auditory attention orientation, thereby improving the quality of the voice signal outputted by the hearing aid device.

According to an embodiment, the performing decision fusion on the feature representation and the auditory attention orientation to obtain a target feature representation and a target auditory attention orientation includes: inputting the feature representation and the auditory attention orientation to a decision fusion network layer; and optimizing, through the decision fusion network layer, the feature representation based on the auditory attention orientation to obtain the target feature representation, and optimizing the auditory attention orientation based on the feature representation to obtain the target auditory attention orientation.

The decision fusion network layer is a neural network layer for decision fusion.

According to an embodiment, the decision fusion network layer may be at least one layer of a neural network. According to an embodiment, a decision fusion layer may be disposed in the auditory attention target decoding unit and the auditory attention orientation decoding unit as shown in FIG. 4, to perform decision fusion through the auditory attention target decoding unit and the auditory attention orientation decoding unit.

Specifically, the hearing aid device may input the feature representation and the auditory attention orientation to the decision fusion network layer, optimize, through the decision fusion network layer, the feature representation based on the auditory attention orientation to obtain a target feature representation, and optimize the auditory attention orientation based on the feature representation to obtain a target auditory attention orientation. Then, the hearing aid device may extract a voice signal of the auditory attention target from the noisy voice signal in a complex acoustic environment based on the target feature representation, and extract a voice signal of the auditory attention orientation from the noisy voice signal in a complex acoustic environment based on the target auditory attention orientation.

According to the above-mentioned embodiments, the feature representation and the auditory attention orientation are mutually optimized through the decision fusion network layer, which improves accuracy of the feature representation and the auditory attention orientation, such that a voice signal of an accurate auditory attention target and a voice signal of an accurate auditory attention orientation can be extracted according to an accurate target feature representation and an accurate target auditory attention orientation obtained by decision fusion, and then an accurate auditory attention voice signal can be obtained by fusing the voice signal of the accurate auditory attention target and the voice signal of the accurate auditory attention orientation, thereby improving the quality of the voice signal outputted by the hearing aid device.

Figure 5:
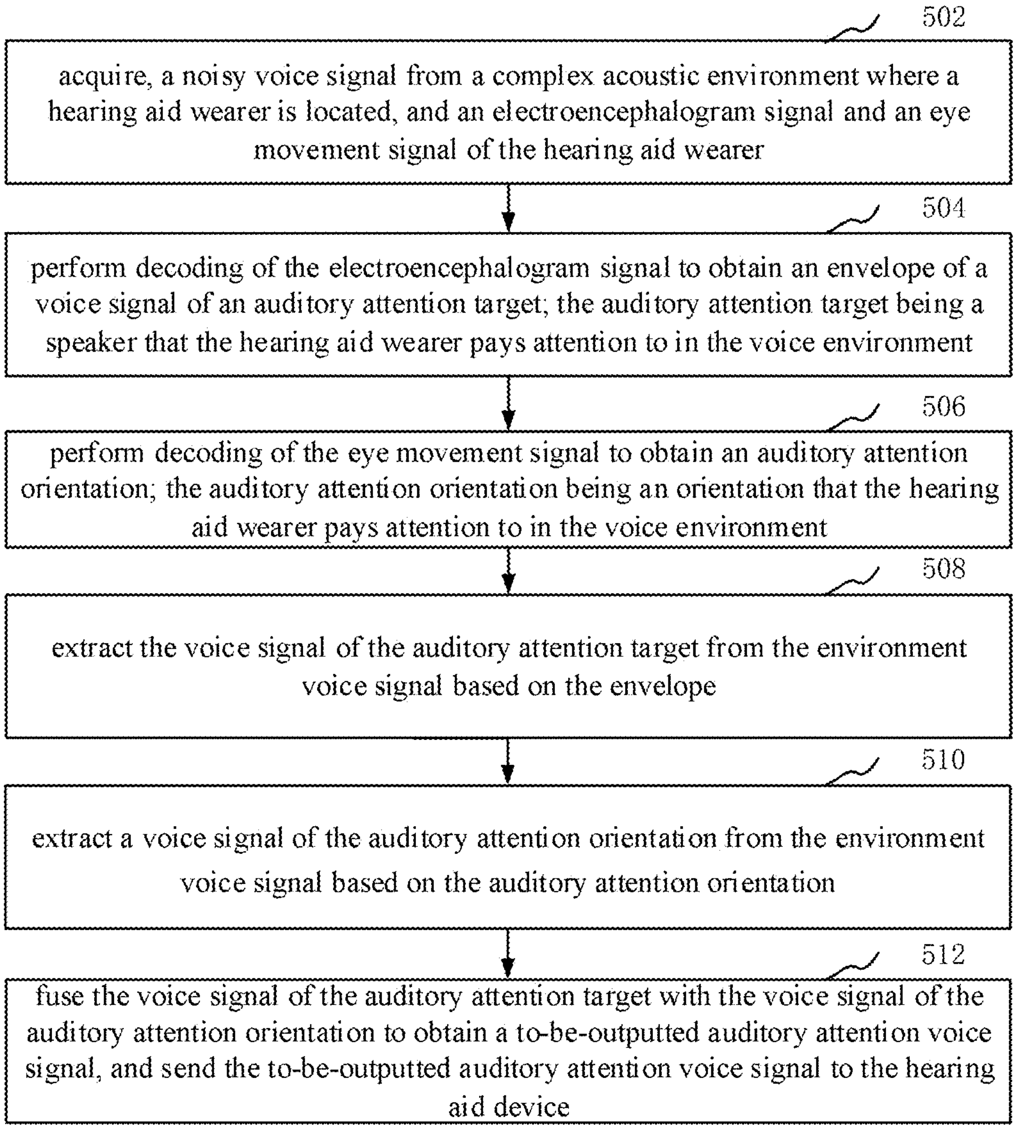
FIG. 5 is a schematic flow chart of a brain-inspired hearing aid method according to another embodiment.

According to an embodiment, as shown in FIG. 5, a brain-inspired hearing aid method is provided. For example, the method is applied to the computer device 210 in FIG. 2, including the following steps.

Step 502 includes: acquiring a noisy voice signal from a complex acoustic environment where a hearing aid wearer is located, and an electroencephalogram signal and an eye movement signal of the hearing aid wearer.

In step 504, decoding is performed based on the electroencephalogram signal to obtain a feature representation of a voice signal of an auditory attention target; the auditory attention target being a speaker that the hearing aid wearer pays attention to in the acoustic environment.

In step 506, decoding is performed based on the eye movement signal to obtain an auditory attention orientation; the auditory attention orientation being an orientation that the hearing aid wearer pays attention to in the acoustic environment.

In step 508, a voice signal of the auditory attention target is extracted from the noisy voice signal in a complex acoustic environment based on the feature representation.

In step 510, a voice signal of the auditory attention orientation is extracted from the noisy voice signal in a complex acoustic environment based on the auditory attention orientation.

In step 512, the voice signal of the auditory attention target is fused with the voice signal of the auditory attention orientation to obtain a to-be-outputted auditory attention voice signal, and the to-be-outputted auditory attention voice signal is sent to the hearing aid device.

Specifically, the hearing aid device may collect the noisy voice signal from a complex acoustic environment, and the electroencephalogram signal and the eye movement signal of the hearing aid wearer. The computer device may acquire, from the hearing aid device, the noisy voice signal in a complex acoustic environment where the hearing aid wearer is located, and the electroencephalogram signal and the eye movement signal of the hearing aid wearer. The computer device may then perform the brain-inspired hearing aid method in the embodiments of the present disclosure to obtain a to-be-outputted auditory attention voice signal, and output the to-be-outputted auditory attention voice signal to the hearing aid device, and the hearing aid device may output the to-be-outputted auditory attention voice signal.

In the above-mentioned brain-inspired hearing aid, a noisy voice signal in a complex acoustic hearing aid wearer is located, and an electroencephalogram signal and an eye movement signal of the hearing aid wearer are acquired from a hearing aid device; decoding is performed based on the electroencephalogram signal to obtain a feature representation of a voice signal of an auditory attention target; decoding is performed based on the eye movement signal to obtain an auditory attention orientation; the voice signal of the auditory attention target is extracted from the noisy voice signal in a complex acoustic environment based on the feature representation; the voice signal of the auditory attention orientation is extracted from the noisy voice signal in a complex acoustic environment based on the auditory attention orientation; finally the voice signal of the auditory attention target is fused with the voice signal of the auditory attention orientation to obtain a to-be-outputted auditory attention voice signal, and the to-be-outputted auditory attention voice signal is sent to the hearing aid device. By means of a multimodal interaction, based on a combination of the noisy voice signal in a complex acoustic environment, the electroencephalogram signal, and the eye movement signal of various modalities, a human brain auditory activity and eye movement of the hearing aid wearer can be coupled, and the voice signal of the auditory attention target and the voice signal of the auditory attention orientation can be extracted respectively based on an auditory attention selection mechanism (i.e., the brain-inspired hearing) and then be fused to obtain the auditory attention voice signal, such that the auditory attention voice signal can be more in line with hearing effect of healthy ears, thereby improving quality of the auditory attention voice signal outputted by the hearing aid device, which enables the hearing impaired person wearing the hearing aid device to listen and communicate normally in a complex acoustic environment, and marks a step forwards towards smart and personalized hearing aid device.

It is to be understood that, although steps in the flow charts involved in the above-mentioned embodiments are displayed in sequence based on indication of arrows, these steps are not necessarily executed sequentially based on the sequence indicated by the arrows. Unless otherwise explicitly specified herein, sequence to execute the steps is not strictly limited, and the steps may be executed in other sequences. In addition, at least some steps in in the flow charts involved in the above-mentioned embodiments may include multiple steps or multiple stages, and these steps or stages are not necessarily executed at the same moment, but may be executed at different moments. These steps or stages are not necessarily executed in sequence, but may be executed in turn or alternately with another step or at least a part of steps or stages of another step.

Based on a same invention concept, a brain-inspired hearing aid apparatus configured to implement the brain-inspired hearing aid method specified above is further provided by the embodiment of the present disclosure. An implementation solution to the problem to be solved provided by the apparatus is similar to the implementation solution documented in the above-mentioned method. Therefore, references of specific limitations on one or more embodiments of the brain-inspired hearing aid apparatus provided in the below may be made to the limitations on the above-mentioned brain-inspired hearing aid method, which is not to be repeated herein.

Figure 6:
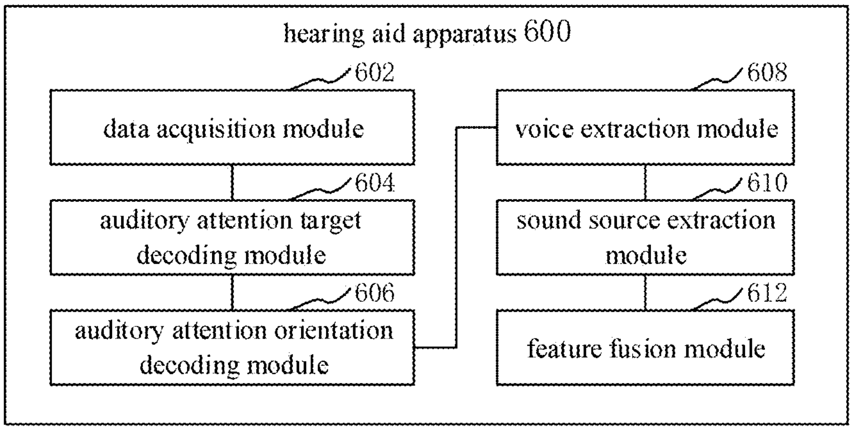
FIG. 6 is a structural block diagram of a brain-inspired hearing aid apparatus according to an embodiment.

According to an embodiment, as shown in FIG. 6, a brain-inspired hearing aid apparatus 600 is provided, including: a data acquisition module 602, an auditory attention target decoding module 604, an auditory attention orientation decoding module 606, a voice extraction module 608, a sound source extraction module 610, and a feature fusion module 612.

The data acquisition module 602 is configured to acquire a noisy voice signal in a complex acoustic environment where a hearing aid wearer is located, and an electroencephalogram signal and an eye movement signal of the hearing aid wearer.

The auditory attention target decoding module 604 is configured to perform decoding of the electroencephalogram signal to obtain a envelope feature representation of a voice signal of an auditory attention target; the auditory attention target being a speaker that the hearing aid wearer pays attention to in the acoustic environment.

The auditory attention orientation decoding module 606 is configured to perform decoding of the eye movement signal to obtain an auditory attention orientation; the auditory attention orientation being an orientation that the hearing aid wearer pays attention to in the acoustic environment.

The voice extraction module 608 is configured to extract a voice signal of the auditory attention target from the noisy voice signal in a complex acoustic environment based on the feature representation.

The sound source extraction module 610 is configured to extract a voice signal of the auditory attention orientation from the noisy voice signal in a complex acoustic environment based on the auditory attention orientation.

The feature fusion module 612 is configured to fuse the voice signal of the auditory attention target with the voice signal of the auditory attention orientation to obtain a to-be-outputted auditory attention voice signal.

According to an embodiment, the auditory attention target decoding module 604 is further configured to input the electroencephalogram signal into a voice feature decoding model, and perform decoding of the voice feature decoding model to obtain the feature representation of the voice signal of the auditory attention target; the voice feature decoding model is pre-trained based on a sample of electroencephalogram signal and a sample of the noisy voice signal in a complex acoustic environment which includes an annotation of the auditory attention target.

According to an embodiment, the auditory attention target decoding module 604 is further configured to input the sample of electroencephalogram signal and the sample of the noisy voice signal in a complex acoustic environment, which includes the annotation of the auditory attention target, into a to-be-trained voice feature decoding model; obtain a predicted feature representation based on the sample of electroencephalogram signal through the to-be-trained voice feature decoding model; and iteratively adjust model parameters of the to-be-trained voice feature decoding model based on a difference between the predicted feature representation and the feature representation of the auditory attention target included in the sample of the noisy voice signal in a complex acoustic environment through the to-be-trained voice feature decoding model until an iteration stop condition is satisfied, such that a trained voice feature decoding model is obtained.

According to an embodiment, the auditory attention orientation decoding module 606 is further configured to input the eye movement signal into a voice orientation decoding model, and perform decoding of the voice orientation decoding model to obtain the auditory attention orientation; the voice orientation decoding model is pre-trained based on a sample of eye movement signal and a sample of the noisy voice signal in a complex acoustic environment which includes an orientation label.

According to an embodiment, the auditory attention orientation decoding module 606 is further configured to input a sample of eye movement signal and a sample of the noisy voice signal in a complex acoustic environment including an orientation label into a to-be-trained voice orientation decoding model; obtain a predicted orientation based on the sample of eye movement signal through the to-be-trained voice orientation decoding model; and iteratively adjust model parameters of the to-be-trained voice orientation decoding model based on a difference between the predicted orientation and the orientation label included in the sample of the noisy voice signal in a complex acoustic environment through the to-be-trained voice orientation decoding model, until an iteration stop condition is satisfied, such that a trained voice orientation decoding model is obtained.

According to an embodiment, the voice extraction module 608 is further configured to input a feature representation and a noisy voice signal in a complex acoustic environment into a voice extraction model, and extract a voice signal of the auditory attention target from the noisy voice signal in a complex acoustic environment based on the feature representation through the voice extraction model.

According to an embodiment, the sound source extraction module 610 is further configured to input an auditory attention orientation and a noisy voice signal in a complex acoustic environment into a sound source extraction model, and extract a voice signal of the auditory attention orientation from the noisy voice signal in a complex acoustic environment based on the auditory attention orientation through the sound source extraction model.

Figure 7:
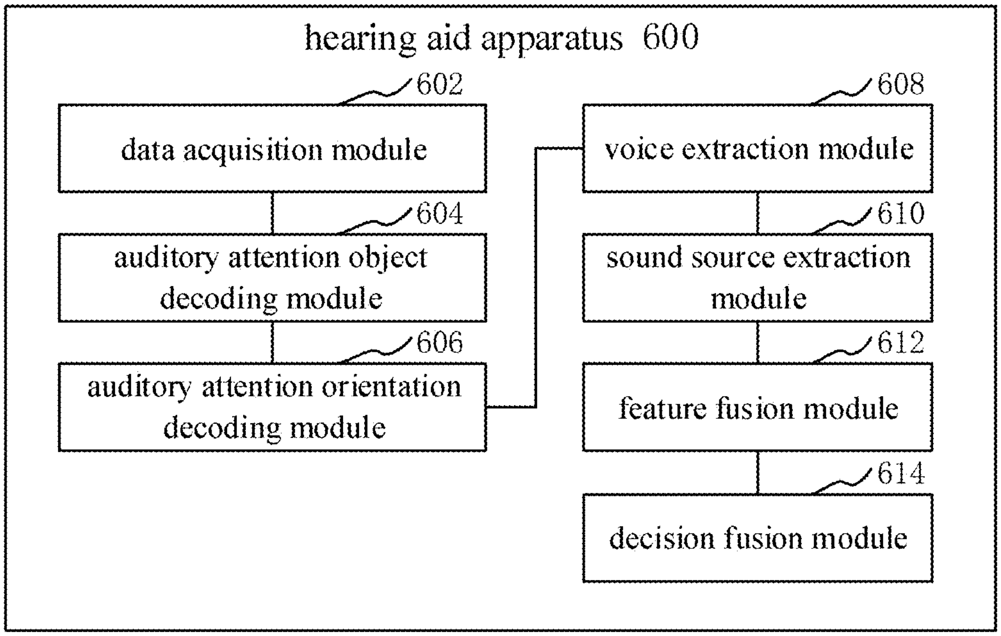
FIG. 7 is a structural block diagram of a brain-inspired hearing aid apparatus according to another embodiment.

According to an embodiment, as shown in FIG. 7, the brain-inspired hearing aid apparatus 600 further includes:

a decision fusion module 614 is configured to perform decision fusion on the feature representation and the auditory attention orientation to obtain a target feature representation and a target auditory attention orientation. The voice extraction model is further configured to extract a voice signal of the auditory attention target from the noisy voice signal in a complex acoustic environment based on the target feature representation. The sound source extraction module is further configured to extract a voice signal of the auditory attention orientation from the noisy voice signal in a complex acoustic environment based on the target auditory attention orientation.

According to an embodiment, the decision fusion module 614 is further configured to input the feature representation and the auditory attention orientation to a decision fusion network layer; and optimize, through the decision fusion network layer, the feature representation based on the auditory attention orientation to obtain a target feature representation, and optimize the auditory attention orientation based on the feature representation to obtain a target auditory attention orientation.

In the above-mentioned brain-inspired hearing aid apparatus, the noisy voice signal in a complex acoustic environment where the hearing aid wearer is located, and the electroencephalogram signal and the eye movement signal of the hearing aid wearer are acquired, decoding is performed based on the electroencephalogram signal to obtain a feature representation of the voice signal of an auditory attention target; decoding is performed based on an eye movement signal to obtain an auditory attention orientation; the voice signal of the auditory attention target is extracted from a noisy voice signal in a complex acoustic environment based on a feature representation; the voice signal of the auditory attention orientation is extracted from the noisy voice signal in a complex acoustic environment based on an auditory attention orientation; and finally the voice signal of the auditory attention target is fused with the voice signal of the auditory attention orientation to obtain a to-be-outputted auditory attention voice signal. By means of a multimodal interaction, based on a combination of the noisy voice signal in a complex acoustic environment, the electroencephalogram signal, and the eye movement signal of various modalities, a human brain auditory activity and eye movement of the hearing aid wearer can be coupled, and a voice signal of the auditory attention target and a voice signal of the auditory attention orientation can be extracted respectively based on an auditory attention selection mechanism (i.e., a brain-inspired hearing) and then be fused to obtain the auditory attention voice signal, such that the auditory attention voice signal can be more in line with hearing effect of healthy ears, thereby improving quality of the auditory attention voice signal outputted by the hearing aid device. This enables the person with healthy ears or the hearing-impaired person wearing the hearing aid device to listen and communicate normally in a complex acoustic environment, realizing intelligenization, scientification, and customization of the hearing aid device.

Modules in the above-mentioned brain-inspired hearing aid apparatus may be implemented entirely or partially by software, hardware, or a combination thereof. The above-mentioned modules may be embedded into or independent of one or more processors in the computer device or the hearing aid device in a form of hardware, or may be stored in a memory of the computer device or the hearing aid device in a form of software, so that it would be convenient for one or more processors to invoke an execution of corresponding operations on the above-mentioned modules.

According to an embodiment, a computer device is provided. The computer device may be a terminal, and a diagram of an internal structure thereof may be shown in FIG. 8. The computer device includes one or more processors, a memory, a communication interface, a display screen, and an input device connected through a system bus. The one or more processors of the computer device are configured to provide computing and control capabilities. The memory of the computer device includes a non-volatile storage medium and an internal memory. The non-volatile storage medium stores an operating system and computer-readable instructions. The internal memory provides an environment for running the operating system and the computer-readable instructions in the non-volatile storage medium. The communication interface of the computer device is configured to communicate with an external terminal in a wired or wireless manner. The wireless manner may be implemented through WIFI, a mobile cellular network, near field communication (NFC), or other technologies. The computer-readable instruction is executed by the one or more processors to implement a brain-inspired hearing aid method. The display screen of the computer device may be a liquid crystal display screen or an electronic ink display screen. The input device of the computer device may be a touch layer covering a display screen, which may be a key, a trackball, or a touchpad disposed on a housing of the computer device, or an external keyboard, a touchpad, a mouse, or the like.

Figure 8:
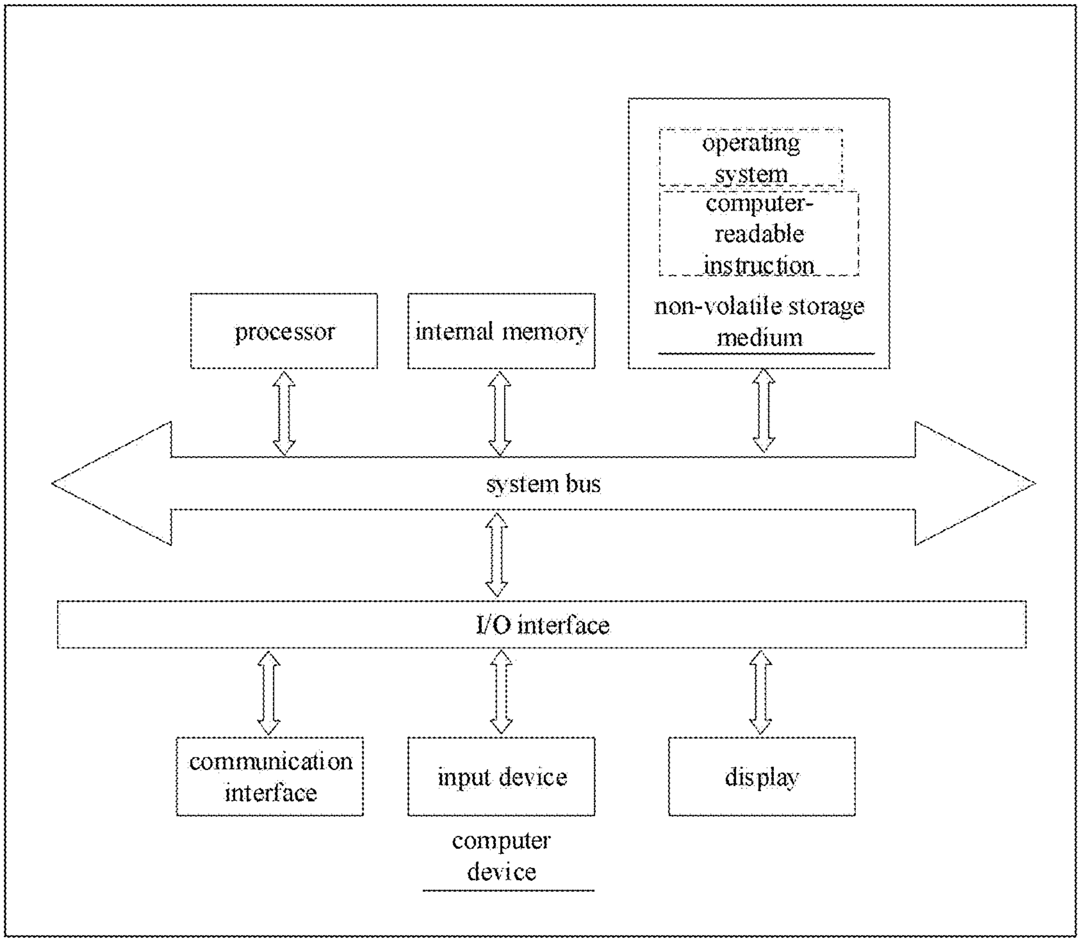
FIG. 8 is a diagram of an internal structure of a computer device according to an embodiment.

Those skilled in the art may understand that, structure shown in FIG. 8 is only a block diagram of a partial structure related to the solution of the present disclosure, which does not constitute a limitation on the computer device to which the solution of the present disclosure is applied. Specifically, the computer device may include more or fewer components than those in the drawings, or include a combination of some components, or include different component layouts.

According to an embodiment, a hearing aid device is provided, including a memory and one or more processors. The memory stores computer-readable instructions. The one or more processors, when executing the computer-readable instructions, implement steps of the method in the above-mentioned embodiments.

According to an embodiment, a computer device is provided, including a memory and one or more processors. The memory stores computer-readable instructions. The one or more processors, when executing the computer-readable instructions, implement steps of the method in the above-mentioned embodiments.

According to an embodiment, one or more computer-readable storage media storing computer-readable instructions are provided. When the computer-readable instructions are executed by one or more processors, steps of the method in the above-mentioned embodiments are implemented.

According to an embodiment, a computer program product is provided, including computer-readable instructions. When the computer program is executed by one or more processors, steps of the method in the above-mentioned embodiments are implemented.

It is to be noted that user information (including, but not limited to, user equipment information, and user personal information, etc.) and data (including, but not limited to, data for analysis, stored data, and displayed data, etc.) involved in the present disclosure are information and data both fully authorized by the user or respective parties.

Those of ordinary skill in the art may understand that all or some procedures of the method in the above-mentioned embodiments may be implemented by computer-readable instructions instructing relevant hardware. The computer-readable instructions may be stored in a non-volatile computer-readable storage medium. When the computer-readable instructions are executed, the procedures of method in the above-mentioned embodiments may be implemented. Any references to a memory, a database, or another medium used in the embodiments provided in the present disclosure may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a Magnetoresistive Random Access Memory (MRAM), a Ferroelectric Random Access Memory (FRAM), a Phase Change Memory (PCM), a graphene memory, and the like. The volatile memory may include a Random Access Memory (RAM), an external cache, or the like. For the purpose of description instead of limitation, the RAM is available in a plurality of forms, such as a Static Random Access Memory (SRAM) or a Dynamic Random Access Memory (DRAM). The database involved in the embodiments provided in the present disclosure may include at least one of a relational database and a non-relational database. The non-relational database may include a blockchain-based distributed database, and the like, but is not limited thereto. The processor involved in the embodiments provided in the present disclosure may be a general-purpose processor, a central processing unit, a graphics processor, a digital signal processor, a programmable logic device, a data processing logic device based on quantum computing, and the like, but is not limited thereto.

The technical features in the above-mentioned embodiments may be randomly combined. For concise description, not all possible combinations of the technical features in the above-mentioned embodiments are described. However, all the combinations of the technical features are to be considered as falling within the scope described in this specification provided that they do not conflict with each other.

The above-mentioned embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the concepts of the present disclosure, and these all fall within the protection scope of the present disclosure. Therefore, the patent protection scope of the present disclosure should be subject to the appended claims.

What is claimed is:

1. A brain-inspired hearing aid method, executed by a hearing aid device, comprising:

acquiring a noisy voice signal in a complex acoustic environment where a hearing aid wearer is located, and an electroencephalogram signal and an eye movement signal of the hearing aid wearer;

performing decoding of the electroencephalogram signal to obtain a feature representation of a voice signal of an auditory attention target; the auditory attention target being a speaker that the hearing aid wearer pays attention to in the acoustic environment;

performing decoding of the eye movement signal to obtain an auditory attention orientation; the auditory attention orientation being an orientation that the hearing aid wearer pays attention to in the acoustic environment;

extracting the voice signal of the auditory attention target from the noisy voice signal in a complex acoustic environment based on the feature representation;

extracting a voice signal of the auditory attention orientation from the noisy voice signal in a complex acoustic environment based on the auditory attention orientation; and fusing the voice signal of the auditory attention target with the voice signal of the auditory attention orientation to obtain a to-be-outputted auditory attention voice signal.

2. The brain-inspired hearing aid method according to claim 1, wherein the performing decoding of the electroencephalogram signal to obtain the feature representation of the voice signal of the auditory attention target comprises:

inputting the electroencephalogram signal into a voice feature decoding model, and performing decoding through the voice feature decoding model to obtain the feature representation of the voice signal of the auditory attention target;

wherein the voice feature decoding model is pre-trained based on a sample of electroencephalogram signal and a sample of the noisy voice signal in a complex acoustic environment comprising an annotation of the auditory attention target.

3. The brain-inspired hearing aid method according to claim 2, wherein the voice feature decoding model is obtained through a step of training the voice feature decoding model; the step of training the voice feature decoding model comprises:

inputting the sample of electroencephalogram signal and the sample of the noisy voice signal in a complex acoustic environment comprising the annotation of the auditory attention target into a to-be-trained voice feature decoding model;

obtaining a predicted feature representation based on the sample of electroencephalogram signal through the to-be-trained voice feature decoding model; and iteratively adjusting model parameters of the to-be-trained voice feature decoding model according to a difference between the predicted feature representation and the feature representation of the auditory attention target which is comprised in the sample of the noisy voice signal in a complex acoustic environment through the to-be-trained voice feature decoding model until an iteration stop condition is satisfied, and obtaining a trained voice feature decoding model.

4. The brain-inspired hearing aid method according to claim 1, wherein the performing decoding of the eye movement signal to obtain the auditory attention orientation comprises:

inputting the eye movement signal into a voice orientation decoding model, and performing decoding through the voice orientation decoding model to obtain the auditory attention orientation;

wherein the voice orientation decoding model is pre-trained based on a sample of eye movement signal and a sample of the noisy voice signal in a complex acoustic environment comprising an orientation label.

5. The brain-inspired hearing aid method according to claim 4, wherein the voice orientation decoding model is obtained through a step of training the voice orientation decoding model; the step of training the voice orientation decoding model comprises:

inputting the sample of eye movement signal and the sample of the noisy voice signal in a complex acoustic environment comprising the orientation label into a to-be-trained voice orientation decoding model;

obtaining a predicted orientation based on the sample of eye movement signal through the to-be-trained voice orientation decoding model; and iteratively adjusting model parameters of the to-be-trained voice orientation decoding model based on a difference between the predicted orientation and the orientation label which is comprised in the sample of the noisy voice signal in a complex acoustic environment through the to-be-trained voice orientation decoding model until an iteration stop condition is satisfied, and obtaining a trained voice orientation decoding model.

6. The brain-inspired hearing aid method according to claim 1, wherein the extracting the voice signal of the auditory attention target from the noisy voice signal in a complex acoustic environment based on the feature representation comprises:

inputting the electroencephalogram signal and the noisy voice signal in a complex acoustic environment into a voice extraction model, and extracting the voice signal of the auditory attention target from the noisy voice signal in a complex acoustic environment based on the feature representation through the voice extraction model.

7. The brain-inspired hearing aid method according to claim 1, wherein the extracting the voice signal of the auditory attention orientation from the noisy voice signal in a complex acoustic environment based on the auditory attention orientation comprises:

inputting the auditory attention orientation and the noisy voice signal in a complex acoustic environment into a sound source extraction model, and extracting the voice signal of the auditory attention orientation from the noisy voice signal in a complex acoustic environment based on the auditory attention orientation through the sound source extraction model.

8. The method according to claim 1, further comprising:

performing decision fusion on the feature representation and the auditory attention orientation to obtain a target feature representation and a target auditory attention orientation;

wherein the extracting the voice signal of the auditory attention target from the noisy voice signal in a complex acoustic environment based on the feature representation comprises:

extracting the voice signal of the auditory attention target from the noisy voice signal in a complex acoustic environment based on the target feature representation; and wherein the extracting the voice signal of the auditory attention orientation from the noisy voice signal in a complex acoustic environment based on the auditory attention orientation comprises:

extracting the voice signal of the auditory attention orientation from the noisy voice signal in a complex acoustic environment based on the target auditory attention orientation.

9. The method according to claim 8, wherein the performing decision fusion on the feature representation and the auditory attention orientation to obtain the target feature representation and the target auditory attention orientation comprises:

inputting the feature representation and the auditory attention orientation to a decision fusion network layer; and optimizing, through the decision fusion network layer, the feature representation based on the auditory attention orientation to obtain the target feature representation, and optimizing the auditory attention orientation based on the feature representation to obtain the target auditory attention orientation.

10. A brain-inspired hearing aid method, executed by a computer device, comprising:

acquiring, a noisy voice signal from a complex acoustic environment where a hearing aid wearer is located, and an electroencephalogram signal and an eye movement signal of the hearing aid wearer;

performing decoding of the electroencephalogram signal to obtain a feature representation of a voice signal of an auditory attention target; the auditory attention target being a speaker that the hearing aid wearer pays attention to in the acoustic environment;

performing decoding of the eye movement signal to obtain an auditory attention orientation; the auditory attention orientation being an orientation that the hearing aid wearer pays attention to in the acoustic environment;

extracting the voice signal of the auditory attention target from the noisy voice signal in a complex acoustic environment based on the feature representation;

extracting a voice signal of the auditory attention orientation from the noisy voice signal in a complex acoustic environment based on the auditory attention orientation; and fusing the voice signal of the auditory attention target with the voice signal of the auditory attention orientation to obtain a to-be-outputted auditory attention voice signal, and sending the to-be-outputted auditory attention voice signal to the hearing aid device.

11. A brain-inspired hearing aid apparatus, comprising:

a data acquisition module, configured to acquire a noisy voice signal in a complex acoustic environment where a hearing aid wearer is located, and an electroencephalogram signal and an eye movement signal of the hearing aid wearer;

an auditory attention target decoding module, configured to perform decoding of the electroencephalogram signal to obtain a feature representation of a voice signal of an auditory attention target; the auditory attention target being a speaker that the hearing aid wearer pays attention to in the acoustic environment;

an auditory attention orientation decoding module, configured to perform decoding of the eye movement signal to obtain an auditory attention orientation; the auditory attention orientation being an orientation that the hearing aid wearer pays attention to in the acoustic environment;

a voice extraction module, configured to extract a voice signal of the auditory attention target from the noisy voice signal in a complex acoustic environment based on the feature representation;

a sound source extraction module, configured to extract a voice signal of the auditory attention orientation from the noisy voice signal in a complex acoustic environment based on the auditory attention orientation; and a feature fusion module, configured to fuse the voice signal of the auditory attention target with the voice signal of the auditory attention orientation to obtain a to-be-outputted auditory attention voice signal.

12. A hearing aid device, comprising one or more memories and a processor, the memories storing computer-readable instructions, wherein the processor, when executing the computer-readable instructions, implements steps of the method according to claim 1.

13. A computer device, comprising a memory and one or more processors, the memory storing computer-readable instructions, wherein the one or more processors, when executing the computer-readable instructions, implement steps of the method according to claim 1.

14. A non-transitory computer-readable storage medium, which stores computer-readable instructions thereon, wherein the computer-readable instructions are adapted to be loaded by one or more processors and perform the method according to claim 1.

15. A computer program product stored on a non-transitory computer-readable storage medium, the computer program product comprising computer-readable instructions, wherein the computer-readable instructions, when executed by one or more processors, implement steps of the method according to claim 1.

* * * * *